(12) United States Patent
Snowdon

(10) Patent No.: US 6,702,539 B2
(45) Date of Patent: *Mar. 9, 2004

(54) PNEUMATIC CONVEYING

(75) Inventor: Brian Snowdon, Doncaster (GB)

(73) Assignee: CleanCut Technologies Limited, Edinborough (GB)

( * ) Notice: Subject to any disclaimer, the term of this patent is extended or adjusted under 35 U.S.C. 154(b) by 0 days.

This patent is subject to a terminal disclaimer.

(21) Appl. No.: 10/405,305

(22) Filed: Apr. 2, 2003

(65) Prior Publication Data

US 2003/0190199 A1 Oct. 9, 2003

Related U.S. Application Data

(62) Division of application No. 10/018,124, filed as application No. PCT/GB00/02158 on Jun. 14, 2000.

(30) Foreign Application Priority Data

Jun. 16, 1999 (GB) .............................................. 9913909

(51) Int. Cl.[7] .............................................. B63B 27/00
(52) U.S. Cl. ............................... 414/137.1; 414/137.9; 406/146; 406/197; 175/206
(58) Field of Search ................................ 406/121, 146, 406/197; 414/137.1, 137.6, 137.9, 139.4; 175/206

(56) References Cited

U.S. PATENT DOCUMENTS

| | | |
|---|---|---|
| 599,702 A | 3/1898 | Griswold |
| 1,127,660 A | 2/1915 | McMichael |
| 1,309,671 A | 7/1919 | Weaver |
| 1,347,358 A | 7/1920 | Adams et al. |
| 1,782,681 A | 11/1930 | Foss et al. |
| 1,983,185 A | 12/1934 | Novak |
| 2,073,982 A | 3/1937 | Woodruff |
| 2,115,023 A | 4/1938 | Kennedy et al. |
| 2,380,651 A | 7/1945 | Jeffery |
| 2,599,235 A | 6/1952 | Coney |
| 2,612,297 A | 9/1952 | Bain |
| 2,753,220 A | 7/1956 | Kemper |
| 3,001,829 A | 9/1961 | De Saint-Martin |
| 3,136,456 A | 6/1964 | Sherbondy |
| 3,195,960 A | 7/1965 | Trythall |

(List continued on next page.)

FOREIGN PATENT DOCUMENTS

| | | |
|---|---|---|
| CA | 1-291192 | 10/1991 |
| DE | 1013222 | 8/1957 |
| DE | 1031215 | 5/1958 |
| DE | 1121997 | 1/1962 |
| DE | 1128809 | 4/1962 |
| DE | 1277119 | 9/1968 |
| DE | 1296097 | 5/1969 |
| DE | 2328496 | 1/1975 |
| DE | 2616430 | 11/1976 |
| DE | 2755671 | 6/1979 |
| DE | 2922453 | 12/1980 |

(List continued on next page.)

*Primary Examiner*—Joseph A. Dillon
(74) *Attorney, Agent, or Firm*—Jones Day

(57) ABSTRACT

A method for conveying a non-free flowing paste where the non-free flowing paste is loaded into a vessel or container having a conical lower portion designed to provide mass flow of the paste. A gas is applied to the vessel to cause the paste to flow out. The paste may be transported to another vessel having a mass flow conical lower portion where it may be stored. The paste may then be discharged using a gas to transport the paste to a third vessel having a mass flow conical lower portion where the loaded vessel itself may be transported, such as by boat, to another destination, such as the shore. The third vessel may be disposed vertically or horizontally on the boat. Thereafter, the paste may be transported to a fourth vessel for further transport or the third vessel may be moved from the boat to a truck for further transport. A frame, the size of a shipping container may enclose a vessel or the frame enclosed vessel may be coupled to other frame enclosed vessels.

9 Claims, 10 Drawing Sheets

U.S. PATENT DOCUMENTS

| | | |
|---|---|---|
| 3,197,259 A | 7/1965 | Braun-Angott |
| 3,258,176 A | 6/1966 | C. Raczynski |
| 3,272,393 A | 9/1966 | Roeser |
| 3,281,019 A | 10/1966 | Curry |
| 3,362,487 A | 1/1968 | Lindsey |
| 3,363,404 A | 1/1968 | Griffin, III et al. |
| 3,369,716 A | 2/1968 | Hulbert, Jr. |
| 3,501,061 A | 3/1970 | Hermanns |
| 3,568,865 A | 3/1971 | Willmroth |
| 3,586,383 A | 6/1971 | Trythall |
| 3,773,230 A | 11/1973 | Murfitt |
| 3,797,707 A | 3/1974 | Jenike et al. |
| 3,809,436 A | 5/1974 | Claffone |
| 3,811,518 A | 5/1974 | Kalaf et al. |
| 3,921,858 A | 11/1975 | Bemm |
| 3,955,717 A | 5/1976 | Landau |
| 3,964,557 A | 6/1976 | Juykam-Wold |
| 4,036,099 A | 7/1977 | French |
| 4,059,195 A | 11/1977 | MacDonald et al. |
| 4,059,311 A | 11/1977 | Spitzer et al. |
| 4,073,244 A | 2/1978 | Snowdon |
| 4,098,541 A | 7/1978 | Côté |
| 4,101,175 A | 7/1978 | Kull |
| 4,113,151 A | 9/1978 | Brown et al. |
| 4,137,935 A | 2/1979 | Snowdon |
| 4,174,868 A | 11/1979 | De Nardo |
| 4,175,039 A | 11/1979 | Fisher |
| 4,209,381 A | 6/1980 | Kelly, Jr. |
| 4,242,146 A | 12/1980 | Kelly, Jr. |
| 4,355,929 A | 10/1982 | Snowdon |
| 4,439,069 A | 3/1984 | Kelly, Jr. et al. |
| 4,451,184 A | 5/1984 | Mitchell |
| 4,515,503 A | 5/1985 | Snowdon |
| 4,525,282 A * | 6/1985 | Bartsch et al. .............. 210/747 |
| 4,526,121 A | 7/1985 | Shudo et al. |
| 4,645,608 A | 2/1987 | Rayborn |
| 4,662,799 A | 5/1987 | Paul et al. |
| 4,671,431 A | 6/1987 | Obrist |
| 4,683,963 A | 8/1987 | Skinner |
| 4,696,353 A | 9/1987 | Elmquist et al. |
| 4,699,548 A | 10/1987 | Bergstrom |
| 4,747,961 A | 5/1988 | Beer et al. |
| 4,793,423 A | 12/1988 | Knol |
| 4,823,989 A | 4/1989 | Nilsson |
| 4,834,587 A | 5/1989 | Crawley et al. |
| 4,836,302 A | 6/1989 | Heilhecker et al. |
| 4,872,949 A | 10/1989 | Wilwerding |
| 4,913,245 A | 4/1990 | Skinner |
| 4,942,929 A | 7/1990 | Malachosky et al. |
| 5,012,957 A | 5/1991 | Mihail |
| 5,109,933 A | 5/1992 | Jackson |
| 5,125,540 A | 6/1992 | Rodriguez |
| 5,129,468 A | 7/1992 | Parmenter |
| 5,129,469 A | 7/1992 | Jackson |
| 5,150,666 A | 9/1992 | Momont et al. |
| 5,213,446 A | 5/1993 | Dovan |
| 5,226,575 A | 7/1993 | Faust |
| 5,226,749 A | 7/1993 | Perkins |
| 5,303,786 A | 4/1994 | Prestridge et al. |
| 5,310,285 A | 5/1994 | Northcott |
| 5,314,265 A | 5/1994 | Perkins et al. |
| 5,330,017 A | 7/1994 | Hart et al. |
| 5,339,912 A | 8/1994 | Hosie et al. |
| 5,341,882 A | 8/1994 | Hale |
| 5,356,034 A | 10/1994 | Schlumberger |
| 5,402,857 A | 4/1995 | Dietzen |
| 5,405,223 A | 4/1995 | Sirevag |
| 5,454,957 A | 10/1995 | Roff, Jr. |
| 5,494,381 A | 2/1996 | Heyl et al. |
| 5,542,719 A | 8/1996 | Nordin |
| 5,556,238 A | 9/1996 | Chinh |
| 5,564,509 A | 10/1996 | Dietzen |
| 5,570,749 A | 11/1996 | Reed |
| 5,584,416 A | 12/1996 | Florian |
| 5,589,603 A | 12/1996 | Alexander et al. |
| 5,618,136 A | 4/1997 | Smoot |
| 5,686,685 A | 11/1997 | McDonald et al. |
| 5,725,021 A | 3/1998 | Dallas |
| 5,755,892 A | 5/1998 | Herold et al. |
| 5,816,450 A | 10/1998 | Alexander et al. |
| 5,839,521 A | 11/1998 | Dietzen |
| 5,842,529 A | 12/1998 | Dietzen |
| 5,863,430 A | 1/1999 | Williams |
| 5,913,372 A | 6/1999 | Dietzen |
| 5,928,519 A | 7/1999 | Homan |
| 5,964,304 A | 10/1999 | Morrison |
| 5,971,084 A | 10/1999 | Dietzen |
| 5,996,484 A | 12/1999 | Reddoch |
| 6,009,959 A | 1/2000 | Dietzen |
| 6,085,939 A | 7/2000 | Geweke et al. |
| 6,152,656 A | 11/2000 | Curtis et al. |
| 6,170,580 B1 | 1/2001 | Reddoch |
| 6,179,070 B1 | 1/2001 | Dietzen |
| 6,179,071 B1 | 1/2001 | Dietzen |
| 6,213,227 B1 | 4/2001 | Dietzen |
| 6,224,534 B1 | 5/2001 | Limia et al. |
| 6,234,258 B1 | 5/2001 | Karigan |
| 6,279,471 B1 | 8/2001 | Reddoch |
| 6,325,572 B1 | 12/2001 | Dietrich |
| 6,328,118 B1 | 12/2001 | Karigan et al. |
| 6,345,672 B1 | 2/2002 | Dietzen |
| 6,368,029 B1 | 4/2002 | d'Aquin |
| 6,443,613 B1 | 9/2002 | Rumph |
| 6,453,584 B1 | 9/2002 | Buckner |
| 6,530,438 B1 * | 3/2003 | McIntyre .................... 175/66 |

FOREIGN PATENT DOCUMENTS

| | | |
|---|---|---|
| DE | 3012065 | 10/1981 |
| DE | 3233099 | 3/1984 |
| DE | 3303542 | 8/1984 |
| DE | 3333433 | 3/1985 |
| DE | 3410244 | 10/1985 |
| DE | 3439251 | 4/1986 |
| DE | 4007430 | 9/1991 |
| DE | 4010676 | 10/1991 |
| EP | 0060137 | 9/1982 |
| EP | 0140570 | 5/1985 |
| EP | 0060136 | 5/1988 |
| EP | 0223589 | 7/1991 |
| EP | 0630839 | 12/1994 |
| EP | 0787671 | 8/1997 |
| FR | 642010 | 8/1928 |
| FR | 979085 | 4/1951 |
| FR | 1154954 | 4/1958 |
| FR | 1184961 | 7/1959 |
| FR | 1285957 | 1/1962 |
| FR | 1295567 | 5/1962 |
| FR | 1349001 | 12/1963 |
| FR | 1382944 | 11/1964 |
| FR | 1396528 | 3/1965 |
| FR | 1477357 | 3/1967 |
| FR | 1507659 | 11/1967 |
| FR | 1551795 | 11/1968 |
| FR | 2237819 | 2/1975 |
| GB | 419756 | 11/1934 |
| GB | 671111 | 4/1952 |
| GB | 770377 | 3/1957 |
| GB | 779479 | 7/1957 |
| GB | 1094080 | 12/1967 |
| GB | 1151246 | 5/1969 |
| GB | 1172575 | 12/1969 |

| | | | | | |
|---|---|---|---|---|---|
| GB | 1216009 | 12/1970 | GB | 2279429 | 1/1995 |
| GB | 1216506 | 12/1970 | JP | 0214519 | 8/1989 |
| GB | 1216507 | 12/1970 | SU | 1751121 | 7/1992 |
| GB | 1386710 | 3/1975 | WO | WO 82/00992 | 4/1982 |
| GB | 1426035 | 2/1976 | WO | WO 90/08712 | 8/1990 |
| GB | 1564311 | 4/1980 | WO | WO 95/0426 | 1/1995 |
| GB | 1595065 | 8/1981 | | | |
| GB | 2147397 | 5/1985 | | | |
| GB | 2183210 | 6/1987 | | | |

\* cited by examiner

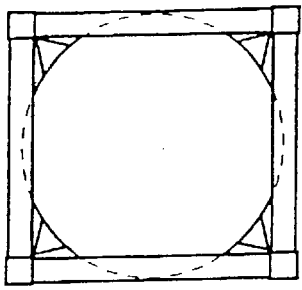
Fig. 7B
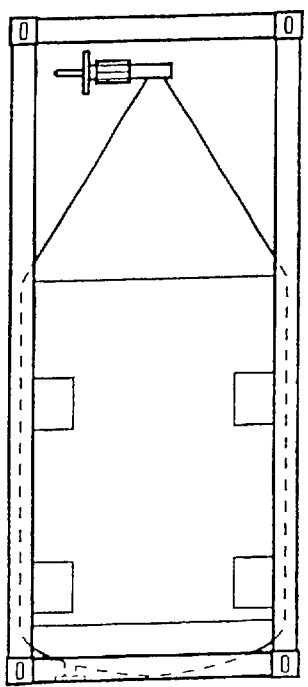
Fig. 7A
Fig. 7
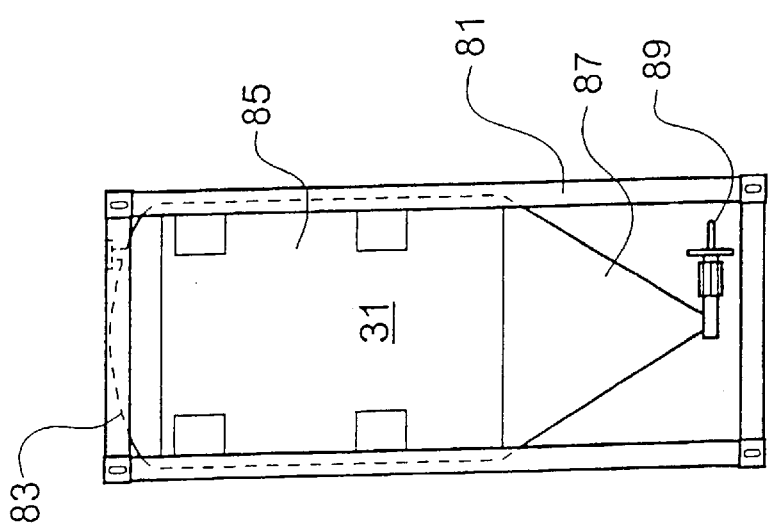
Fig. 7C

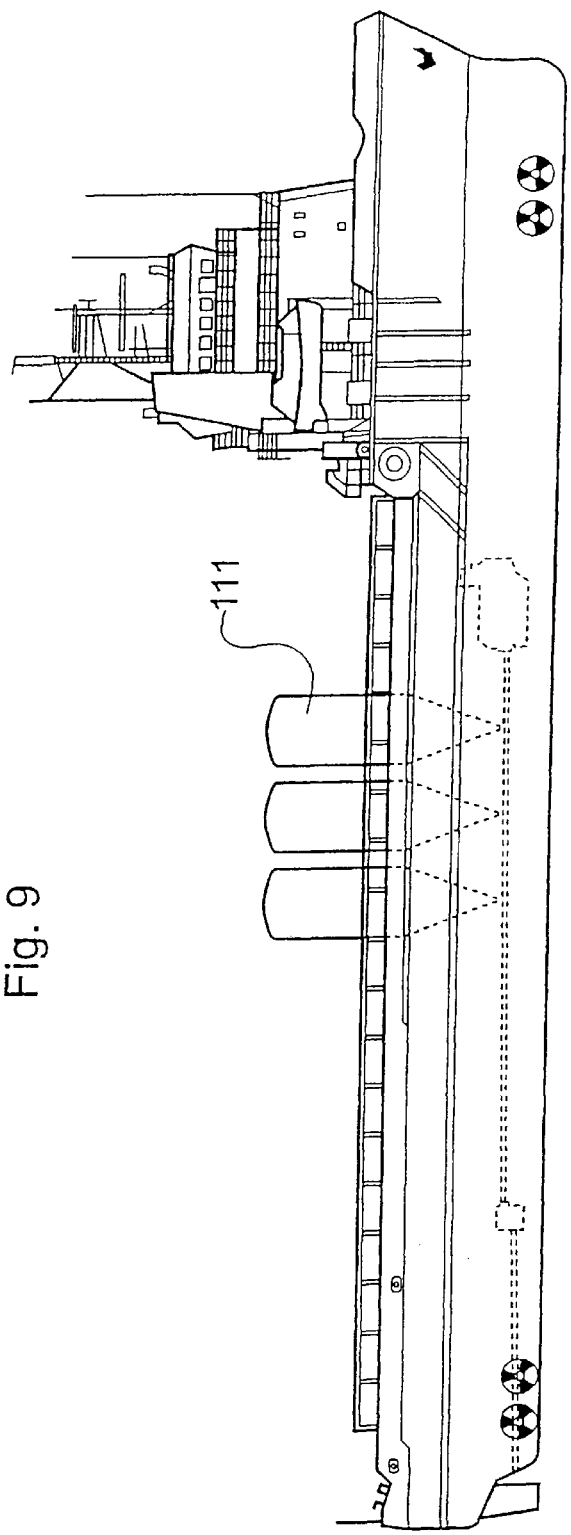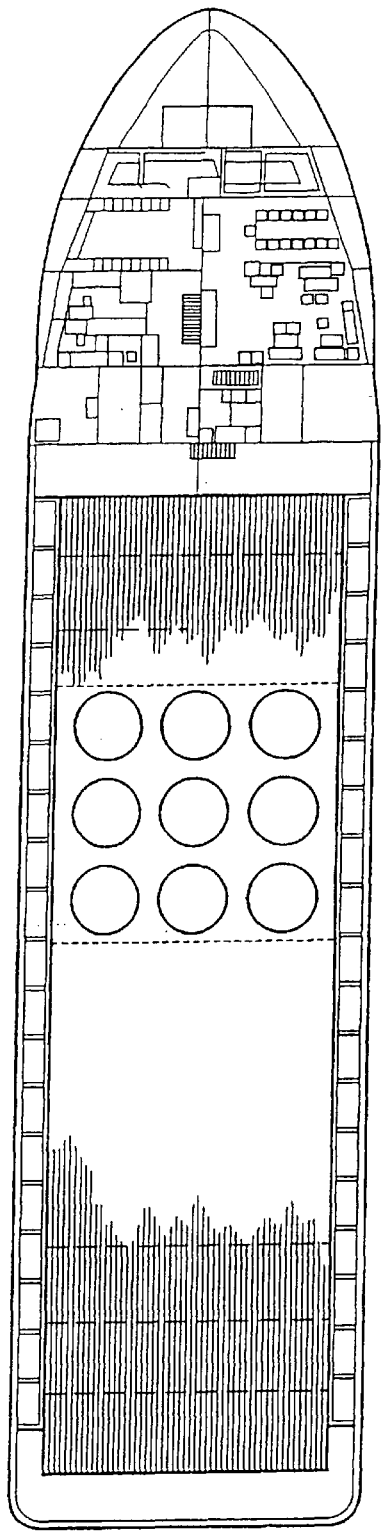
Fig. 9
Fig. 9A
Fig. 9B

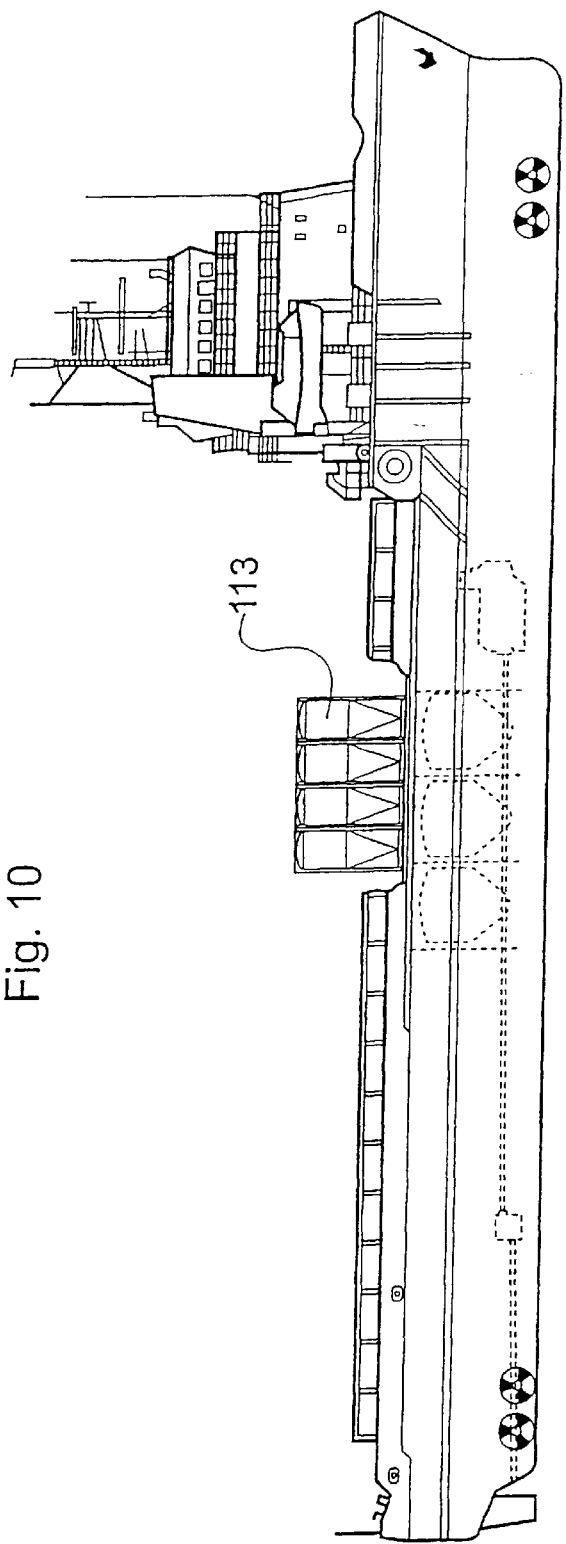
Fig. 10
Fig. 10A
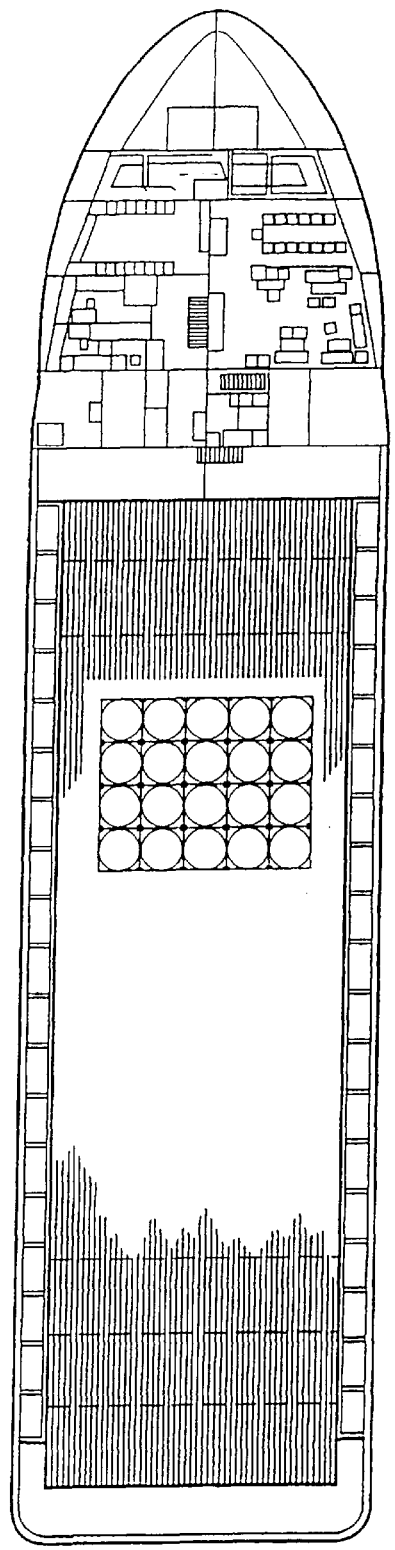
Fig. 10 B

PNEUMATIC CONVEYING

BACKGROUND OF THE INVENTION

CROSS REFERENCE TO RELATED APPLICATIONS

This application is a divisional of application Ser. No. 10/018,124, filed May 12, 2002, entitled Pneumatic Conveying which in turn is based upon a PCT application. Application No. PCT/GB00/02158 with an international filing date of Jun. 14, 2000, which in turn is based upon a UK application, Application No. 9913909.9, filed Jun. 16, 1999. Priority benefits are claimed under any or all: 35 U.S.C. §119(a)–(d) or (f) or 365(b) or 365(a) based on said PCT and UK applications.

STATEMENT RE FEDERALLY SPONSORED RESEARCH

Not applicable.

1. Field of the Invention

This invention relates to pneumatic conveying and, in particular, to the conveying of materials which are in the form of thick, heavy pastes which are normally difficult to move and handle.

2. Description of the Related Art

An example of the sort of material with which this invention is concerned is provided by the oil exploration industry. When oil wells are drilled, the cuttings from the drilling operations are brought up onto the drilling platform. For a large part of the drilling operation, a special type of oil is pumped down to the drilling bits as a lubricant. The oil contaminated material which comes up onto the drilling platform has until recently been dumped into the sea. For environmental reasons, such disposal is no longer permitted and the material now has to be transported to the shore for processing.

On the drilling rig, the oil contaminated cuttings are screened to remove a high proportion of the oil for re-use on the rig. The cuttings, which are still contaminated with some oil, are transported ashore in the form of a very thick heavy paste. Typically the material is put into special skips of about 10 ton capacity which are loaded by crane from the rig onto supply boats. This is a difficult and dangerous operation in bad weather and is laborious and expensive.

German Patent Application No. 4010676 describes a device for even, continuous conveying of stiff, solids-containing compositions from a pressure vessel into a pipe- or hose-line wherein, at the outlet of the pressure vessel the material to be conveyed is mixed with the conveying air in a nozzle, while the material to be conveyed is fed evenly to the nozzle by means of a conveying screw. However, such a device suffers from the disadvantage that mechanical agitation is required.

BRIEF SUMMARY OF THE INVENTION

We have now surprisingly found a novel method of transferring thick heavy pastes material e.g. drill cuttings which has not been previously possible.

Accordingly, the present invention is based on surprising discovery that it is possible to transport a material in the form of a thick heavy paste by means of pneumatic conveying from a relatively large vessel. Hitherto, it has been supposed that pneumatic conveying systems were only suitable for relatively free flowing material or conveying of small batches of wet sticky materials.

Thus, according to the present invention there is provided a method of conveying a non-free flowing paste comprising loading the paste into a transportable vessel and applying a compressed gas to the vessel to cause the material to flow out of the vessel.

The non-free flowing paste may be a thick and/or heavy paste or clay like material, e.g. oil rig drill cuttings.

Thus, the transportable vessel is preferably a combined storage and pneumatic conveying vessel.

The compressed gas is preferably compressed air, because it is relatively inexpensive although in certain instances an inert gas may be used, for example, compressed nitrogen.

The vessel is provided with an inlet and an outlet, such that loading of the vessel is via the inlet. Preferentially the outlet is connected to a conduit which leads to the final desired destination of the material.

In a preferred embodiment the method of the invention also includes the step of transporting the vessel, having at least partially filled it with said material, from its filling station to a discharge station. At the discharge station, compressed air is applied to the interior of the vessel to convey the material out of the vessel to its destination.

Preferably the vessel includes a conical hopper portion which, at least during discharge of the material, forms the lower section of the vessel. In a further preferred embodiment, the lower conical hopper portion is the outlet end of the vessel.

Because of the nature of the material being handled in the method of the present invention, there is a tendency for the flow of the material out of the vessel to be less than complete. This is because the type of flow which occurs during discharge is of a form known as core flow or funnel flow. When this type of flow occurs, the material directly above the outlet falls through the outlet, e.g. the outlet valve, so that a falling core of material is created directly above the outlet. However, with sticky materials, the material around this core does not move. As the core falls, a depression occurs in the top surface of the material and the material surrounding that depression falls into the core. In the case of a sticky material there is a tendency for material around the core to remain in the vessel.

It has been discovered that even for the sort of material with which this invention is concerned, it is possible to change the nature of the flow out of the vessel by altering the cone angle of the lower conical portion of the vessel. If the included cone angle is changed below a certain or critical value, then the flow changes from core flow to so-called mass flow. In the case of mass flow, the material descends as a mass in a uniform way towards the outlet with all the material moving. Accordingly the combination of the use of a vessel designed to achieve mass flow and the application of a compressed gas above the surface of the material is such that it is possible to push the contents of the vessel through the outlet so as fully to empty the vessel.

It is well known that the critical cone angle will vary depending upon the material being conveyed as such would be well understood by those skilled in the art.

The pressure used in the vessel in the method may also vary depending upon the nature of the material. However, we have found that a pressure of between 4 and 8 bar is suitable.

In an embodiment of the present invention the drill cuttings are loaded into a first relatively small vessel capable of being pressurised from which said material is fed under pressure via a pipe to one or more further vessels also capable of being pressurised. Said further vessels may be transported to a position where discharge of material takes place or said further vessels may remain in their original position and the material is discharged from them into yet further vessels which are themselves transported to the destination.

The present invention also provides apparatus for conveying a material in the form of a thick, heavy paste, the apparatus comprising a vessel capable of being pressurised by compressed gas, said vessel having a material inlet, a material outlet and a pipe connected to said material outlet, means for loading the material into said vessel through said inlet, gas supply means for supplying compressed gas to said vessel to cause the material to flow out of the vessel via said outlet and along said pipe.

Conventionally known pressure vessels are expected to withstand a maximum pressure of 2 bar. Thus, in a preferred embodiment the apparatus of the invention comprises a vessel adapted to be pressurised by compressed gas to between 4 and 8 bar.

BRIEF DESCRIPTION OF THE SEVERAL VIEWS OF THE DRAWING

FIG. 7 shows details of a standard ISO container sized vessel which may be used in the method of the present invention;

FIG. 9 shows an oil rig supply boat including vessels which may be used in a method of the present invention;

FIG. 10 is an alternative embodiment of an oil rig supply vessel including vessels of use in a method of the present invention.

DETAILED DESCRIPTION OF THE INVENTION

Embodiments of the present invention will now be described, by way of examples only, and with reference to the accompanying drawings.

Figure 1:
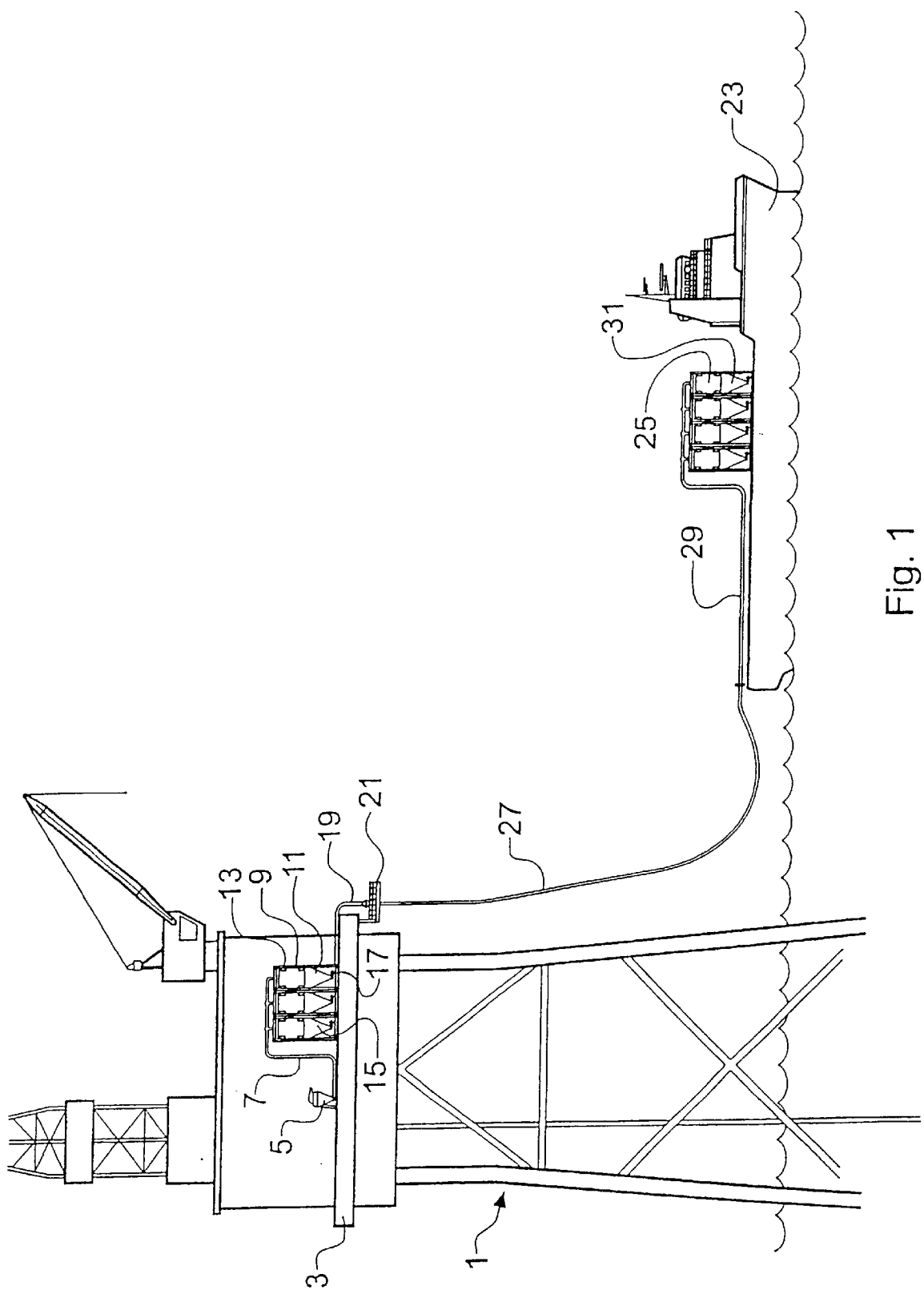
FIG. 1 is an elevation showing the operation of a first method in accordance with the present invention.

Referring to FIG. 1 of the accompanying drawings, an off shore oil rig 1 has located on its platform 3 a pressure vessel 5 into which is loaded the screened drill cuttings arising from the drilling process. This pressure vessel 5 includes an upper material inlet and a lower material outlet as well as means for supplying compressed air to the interior of the vessel. The material inlet includes a valve assembly similar to that described in GB-A-1539079 and the entire vessel may be similar to that manufactured and sold by Clyde Materials Handling Limited (Clyde).

In operation the pneumatic conveying system, including the pressure vessel 5, follows a cycle of filling and discharging material from the pressure vessel. At the start of the cycle, the material inlet valve (in the Clyde system this valve includes a part spherical closure member) is closed. A vent valve is opened to equalise vessel pressure to ambient air. The inlet valve is opened and the oil cuttings/oil mixture is fed into the pressurised vessel. The vent valve is opened to vent displaced air from the vessel. When the pressurised vessel is full, the inlet valve closes. The vent valve also closes and the vessel is now sealed. An air inlet valve is opened and the material is conveyed in the form of a semi solid slug along pipe 7.

As indicated in FIG. 1, pipe 7 extends from a position below pressurised vessel 5 to an elevated position above a container assembly 9. Assembly 9 comprises three ISO container sized vessels 11 located within a support framework 13. (In other embodiments, the container assembly may include a number of vessels 11 other than three). Pipe 7 extends above the top of container assembly 9 and has downwardly extending branches leading into the inlets of each of the containers 11.

Each container 11 has a lower conical shaped hopper portion 15 and at the lowermost point of this portion there is a valve inlet 17 whereby the material within the containers may be discharged via pipe 19 to a hose connection pipe 21.

A supply boat 23, fitted with a further container assembly 25, may be brought close to the oil rig 1. A flexible hose 27 is connected to pipe 19 at hose connection pipe 21. At its other end hose 27 is connected to a filling pipe 29 located on boat 23. Filling pipe 29 leads from the rear of boat 23 to a position above container assembly 25 and branch pipes extends downwardly from pipe 29 to the inlets of each of the containers 31 forming part of the containers assembly 25.

Figure 2:
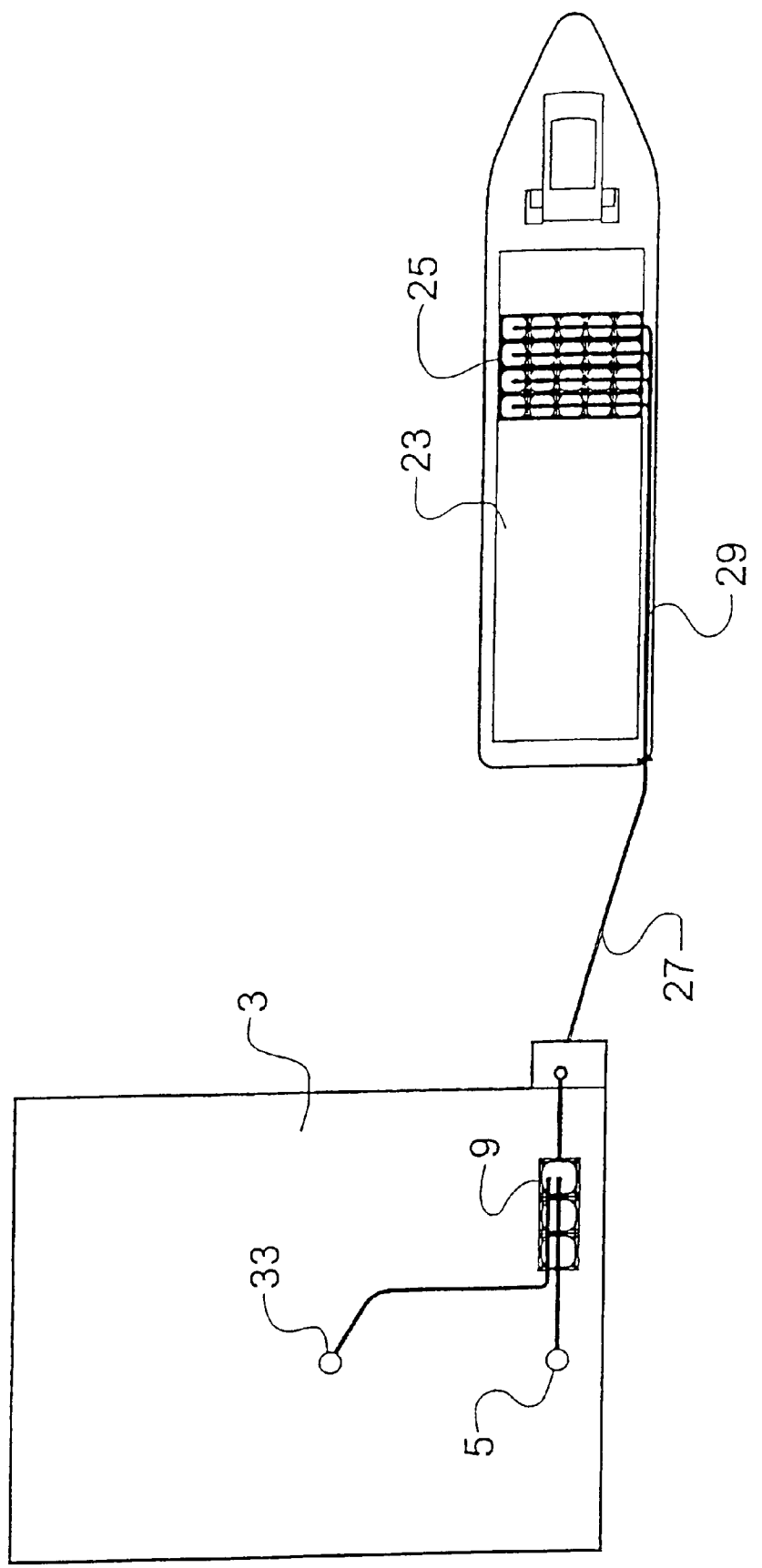
FIG. 2 is a plan view of FIG. 1.

As illustrated in FIG. 2, there may be further pressure vessels such as vessels 33 for feeding the drill cuttings/oil mixture to the container assembly 9.

Figure 3:
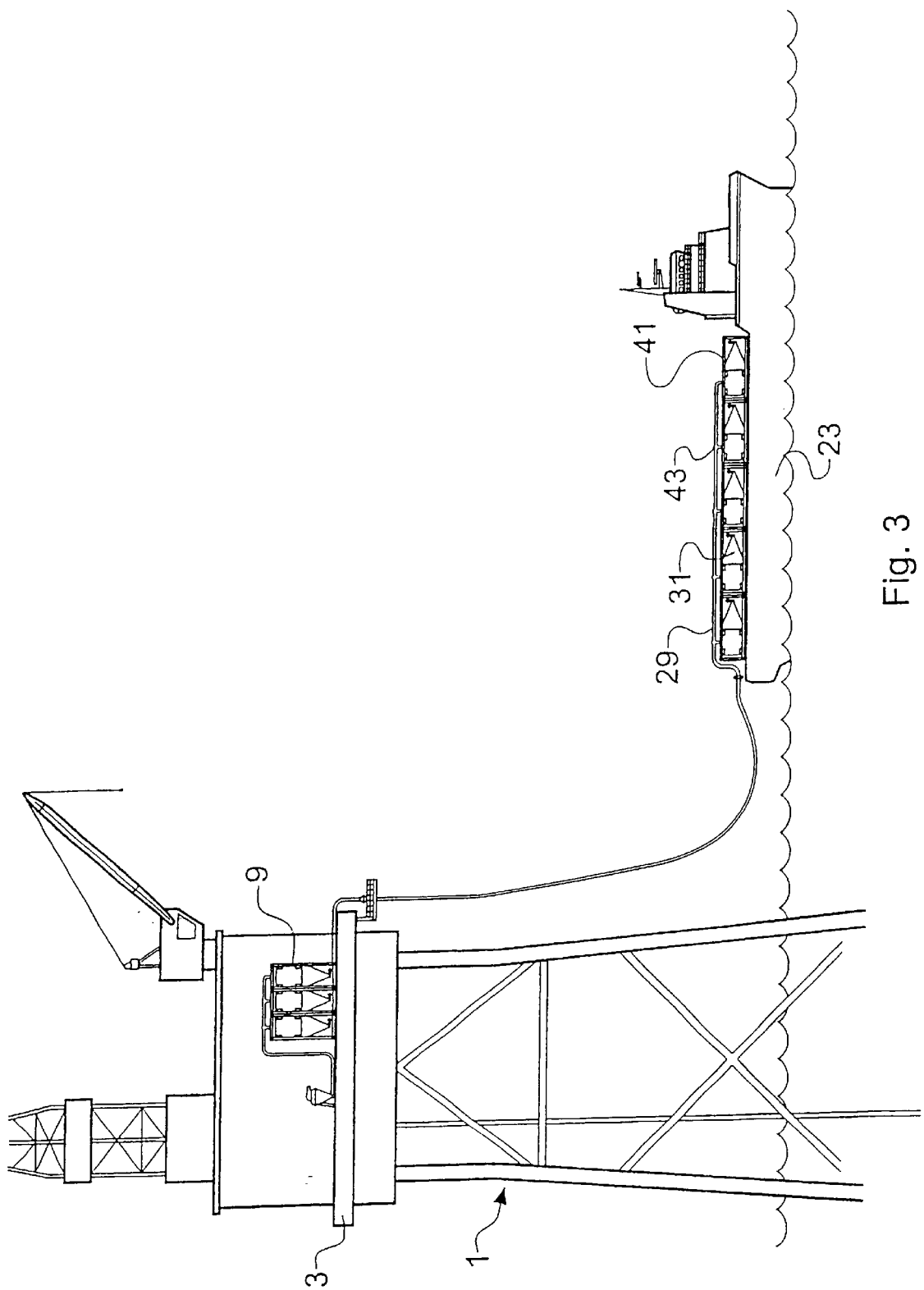
FIG. 3 is an elevation showing the operation of a second method in accordance with the present invention.
Figure 4:
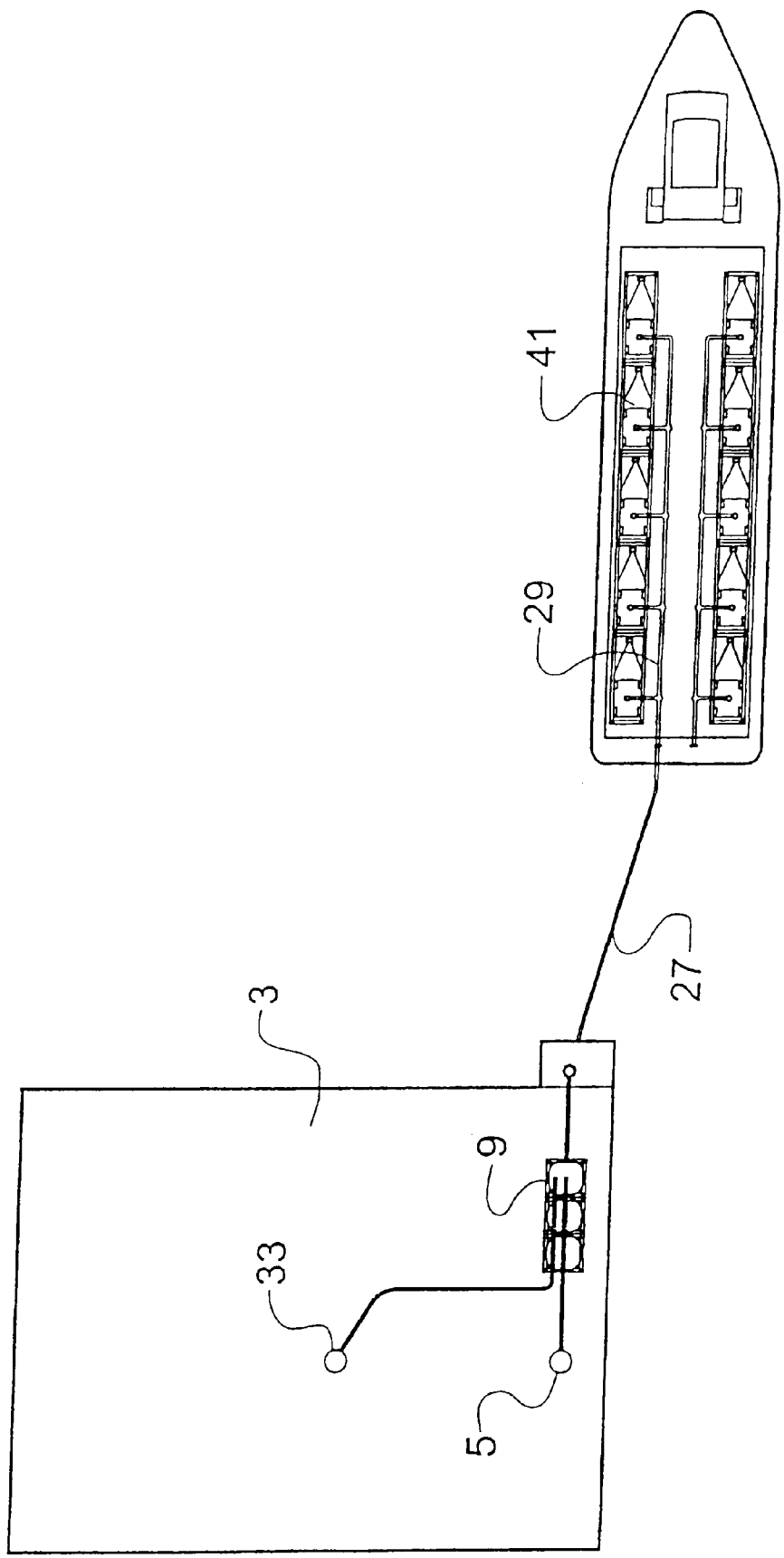
FIG. 4 is a planned view of FIG. 3.

Referring to FIGS. 3 and 4 of the accompanying drawings, there is illustrated an arrangement broadly similar to that described above with reference to FIGS. 1 and 2. However, in this case the drill cuttings/oil mixture is fed from the container assembly 9 located on oil rig platform 3. A container assembly 41 is located on boat 23, the containers in this container assembly being arranged with their longitudinal axes extending horizontally rather than vertically as in the case of the FIG. 1 embodiment. The feed pipe 29 again extends to a position above the container assembly 41 and has branch pipes 43 extending downwardly into inlets in each container which are located in the side of the container.

As better shown in FIG. 4, there are in fact two container assemblies 41, each of which is provided with a feed pipe 29 which may be connected to flexible hose 27.

Figure 5:
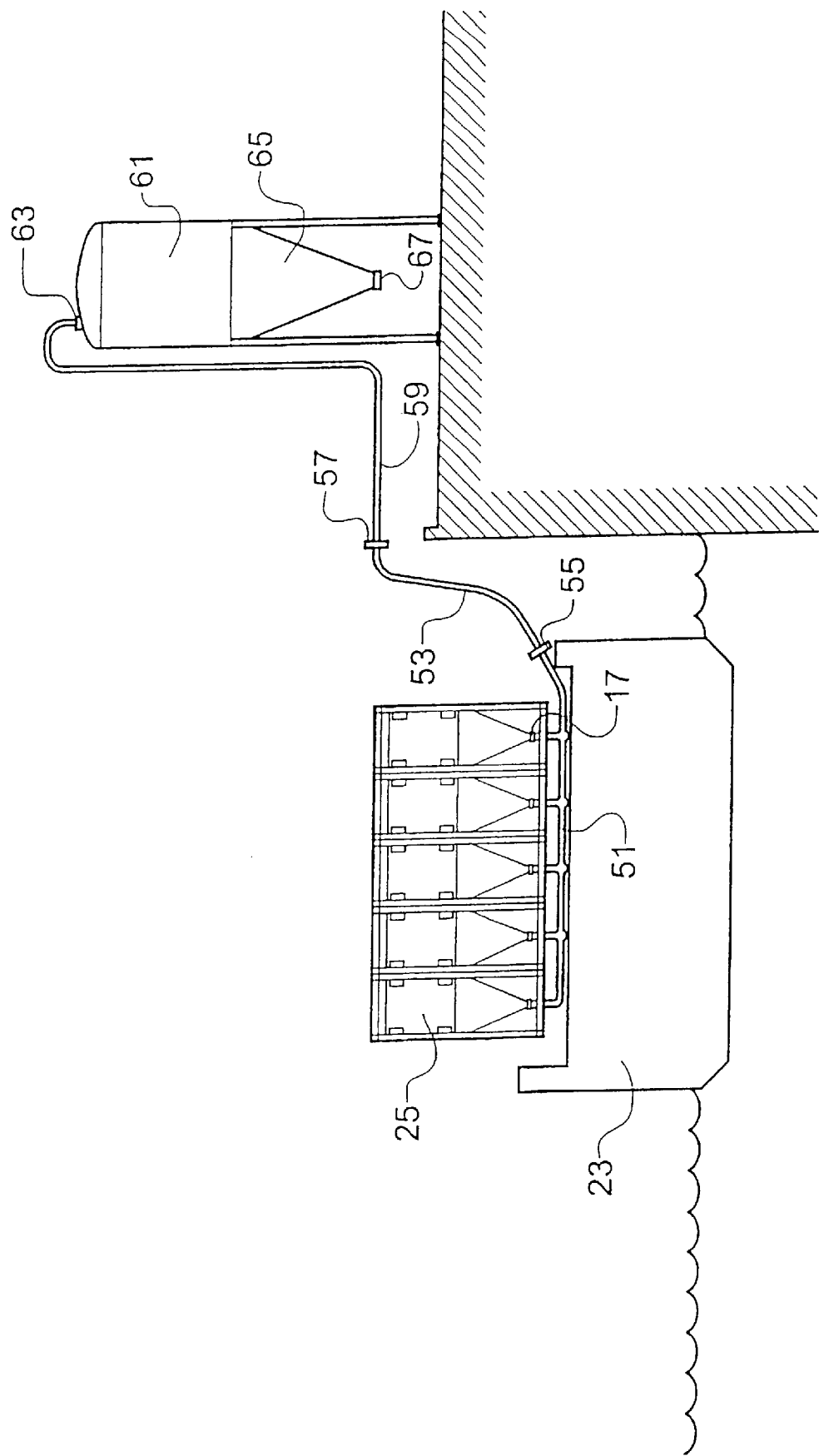
FIG. 5 is an elevation showing a continuation of the operation of the method illustrated in FIG. 1.

Referring to FIG. 5 of the accompanying drawings, there is illustrated a first stage 30 in the method of the present invention described above with reference to FIGS. 1 and 2. Following the loading of the containers 25 on boat 23, the boat is moved to shore where the unloading process is carried out. A discharge pipe 51 extends from outlet 17 of each of the containers 25. This pipe 27 may be connected to a flexible hose 53 which extends from connection point 55 located on ship 23 to a further connection point 57 located on land. Extending from connection point 57 is pipe 59 which leads to an elevated position above a large container 61. Pipe 59 is connected to an inlet 63 at the top of container 61. Container 61 is broadly similar in shape to containers 25 having a lower conical shape portion 65. When desired the material loaded into container 61 may be discharged via a lower outlet 67.

The process of feeding the drill cuttings/oil mixture from containers 25 to large container 61 involves pneumatic conveying similar to that described above in connection with the conveying of the material from pressure vessel 5 to containers 11.

Figure 6:
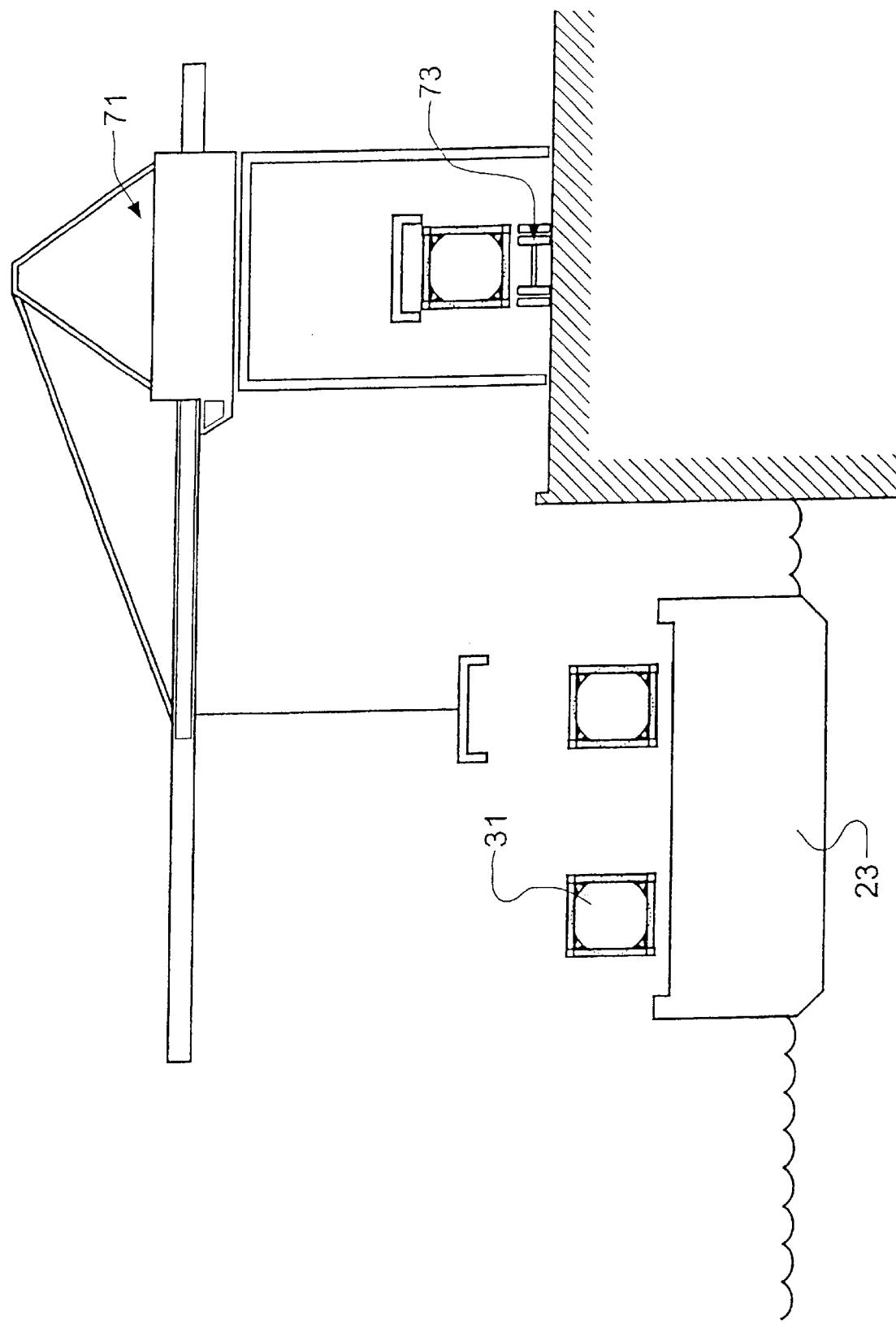
FIG. 6 is an elevation showing the continuation of the operation of the method of FIG. 3.

Referring to FIG. 6 of the accompanying drawings, there is illustrated a further stage in the method described above with reference to FIGS. 3 and 4. Supply boat 23, having had its containers 31 loaded with material, moves from the oil rig 1 to the shore. When berthed, the containers 31 are raised by crane 71 from boat 23 onto a road vehicle 73.

Referring to FIG. 7 of the accompanying drawings, there is illustrated an ISO container sized conveying vessel 31 located within a support frame 81 and being positioned with its longitudinal axis arranged horizontally (FIGS. 7a and 7b) and with this axis lying vertically (FIG. 7c). Vessel 31 has a part spherical shaped upper end 83, a cylindrical main body section 85 and a lower conical section 87. At the lowermost end of conical section 87, the vessel is provided with a discharge valve 89.

Figure 8:
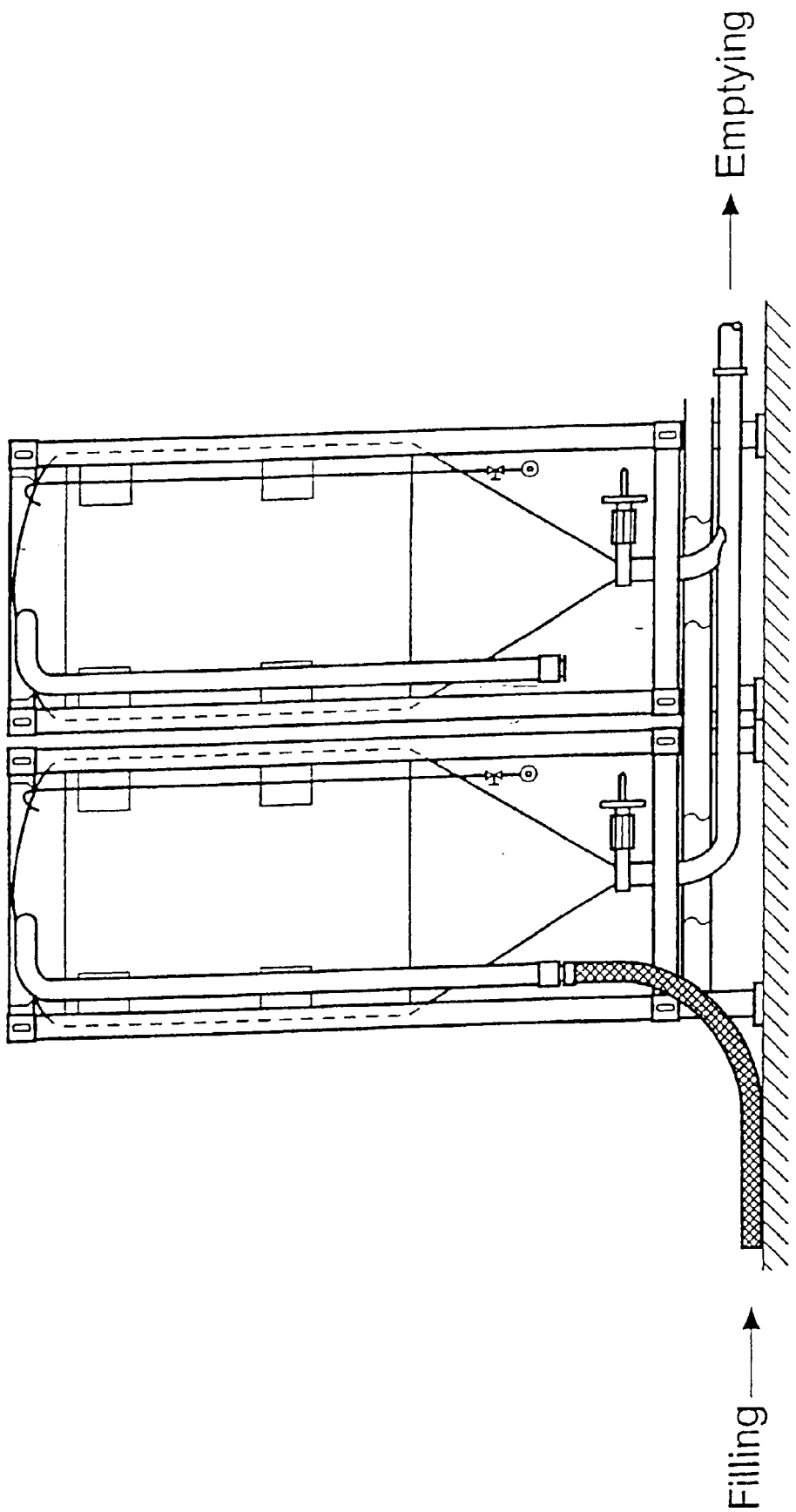
FIG. 8 shows an assembly of two ISO container sized vessels.

Referring to FIG. 8 of the accompanying drawings, there is illustrated a container 30 assembly 91 comprising containers 93, each located with a support frame 95. A filling pipe 97 extends into each container via a valve 99 and, where appropriate a branch pipe 101, the container inlet being located in the upper end 83 of the container. Also extending into the upper end of each container 93 is a compressed air line 103 having valves 105. Any number of containers may be connected in this way with a common material filling pipe and a common material discharge pipe.

At the lower end of each container 93 is a discharge valve 89 having connected thereto a pipe 107 via, if appropriate, a branch pipe 109. In order to empty a vessel filled via pipe 97, valve 99 is closed, valve 89 is opened and compressed air is fed to the vessel via air line 103. The drill cuttings/oil mixture is forced out of vessel 93 under the pressure of the compressed air and into pipe 107. Due to the conical angle of the conical or hopper section 93 being less than a certain value, the material flow out of container 93 is of the type known as mass flow and results in all of the material exiting uniformly out of the container.

Referring to FIG. 9 of the accompanying drawings, there is illustrated in both elevation (FIG. 9a) and in plan (FIG. 9b) a supply boat which is fitted with large conveying vessels 111 which extend through the deck of the boat. This arrangement can hold up to thousand tons of drill cuttings/oil mixture and this mixture can be pumped pneumatically from the tanks onto shore based storage containers. The conveying vessels 111 have a cone angle such that mass flow occurs and they work in a similar way to the assembly of FIG. 8.

Referring to FIG. 10 of the accompanying drawings, there is illustrated another embodiment of a supply boat illustrated in elevation (FIG. 10a) and in plan (FIG. 10b). In this case the boat is for conveying containers 113 which fit within the envelope of a 20 ft ISO container frame.

The use of ISO container vessels enables supply boats to be used in substantially unmodified form. Methods of the present invention involving the use of ISO container vessels may be operated in a different way.

In one embodiment in accordance with the present invention, a number of empty ISO container vessels is lifted onto the drilling rig by the rig crane. The vessels are stood on end on support frames incorporating the discharge piping and they are assembled into a line of storage vessels each of which can store about twenty tons of cuttings/oil. A pressurised vessel 5 (see FIG. 1) is used to transfer the cuttings/oil from screens or centrifuges into the ISO conveying vessels. These vessels are then used to transfer the stored contents onto the supply boat as described above in connection with FIG. 1.

An advantage of this method is that there is a buffer storage on the rig so that drilling can occur when the supply boat is not present. Furthermore transfer rates from the rig are much higher than is possible if a standard pneumatic conveyor system (such as the Clyde system) is used alone. In addition hose sizes can be minimised.

An alternative embodiment making use of the ISO container vessels involves the use of these vessels on the supplied boat. Thirty or forty of these vessels may be stood on end and rafted together to form a stable structure into which 400 or 500 tons of cuttings can be conveyed, as illustrated in FIG. 10. When the vessel returns to port, the contents of the container vessels may be pneumatically transferred ashore.

Alternatively, the tanks may be lifted off by cranes, turned horizontal and loaded onto standard ISO container road vehicles. If appropriate they could also be stacked on the quay side in the same way that containers are currently stacked. When the containers are received at the processing plant they are stood on end and used as conveying vessels to transfer the cuttings/oil into their destination.

In a further embodiment in accordance with the present invention the drill cuttings/oil mixture is stored in large volumes in the legs of semi-submersible oil rigs or drilling platforms. The legs are typically 15 m diameter. Pressurised vessels located in the legs and operating on the same principles as described above will store the cuttings/oil mixture and then be used as pneumatic conveying vessels to transfer the material onto the supply boat.

With some drill cuttings, it may be necessary or desirable to use low friction linings within the pressure vessels. Such linings may be used in conjunction with the use of the mass flow cone angle, as described above, to aid discharge of the drill cuttings from the internal surfaces of the pressure vessels.

What is claimed is:

1. A process for conveying drill cuttings from an oil rig comprising:

introducing drill cuttings from said oil rig into a vessel having a conical portion defining a cone angle selected to achieve mass flow of said drill cuttings in said vessel; and applying a compressed gas to said drill cuttings in said vessel to cause said drill cuttings to flow out of said vessel as the sole means for inducing movement of said drill cuttings from said vessel.

2. The process as claimed in claim 1 including the step of:

conveying said drill cuttings along a pipe or hose.

3. The process as claimed in claim 2 including the steps of:

transporting said drill cuttings to a second vessel having a conical portion defining a cone angle selected to achieve mass flow of said drill cuttings in said second vessel; and applying a compressed gas to said drill cuttings in said second vessel to cause said drill cuttings to flow out of said second vessel.

4. The process as claimed in claim 3 including the step of:

storing said drill cuttings in said second vessel.

5. The process as claimed in claim 1 including the step of:

transporting said vessel before applying said compressed gas.

6. A process for conveying drill cuttings from an oil rig comprising:

providing a vessel having a conical portion defining a cone angle selected to enable mass flow of said drill cuttings in said vessel;

introducing said drill cuttings from said oil rig into said vessel; and applying a compressed gas to said drill cuttings in said vessel as the sole means for inducing movement of said drill cuttings from said vessel to cause said drill cuttings to flow out of said vessel.

7. The process as claimed in claim 6 including the step of:

conveying said drill cuttings along a pipe or hose.

8. The process as claimed in claim 6 including the steps of:

transporting said drill cuttings to a second vessel having a conical portion defining a cone angle selected to enable mass flow of said drill cuttings;

introducing said drill cuttings into said second vessel; and applying a compressed gas to said drill cuttings in said second vessel to cause said drill cuttings to flow out of said second vessel.

9. The process as claimed in claim 8 including the step of:

storing said drill cuttings in said second vessel.

* * * * *